Nov. 6, 1956 R. C. PIERCE 2,769,631
AXLE ASSEMBLY
Filed April 8, 1952
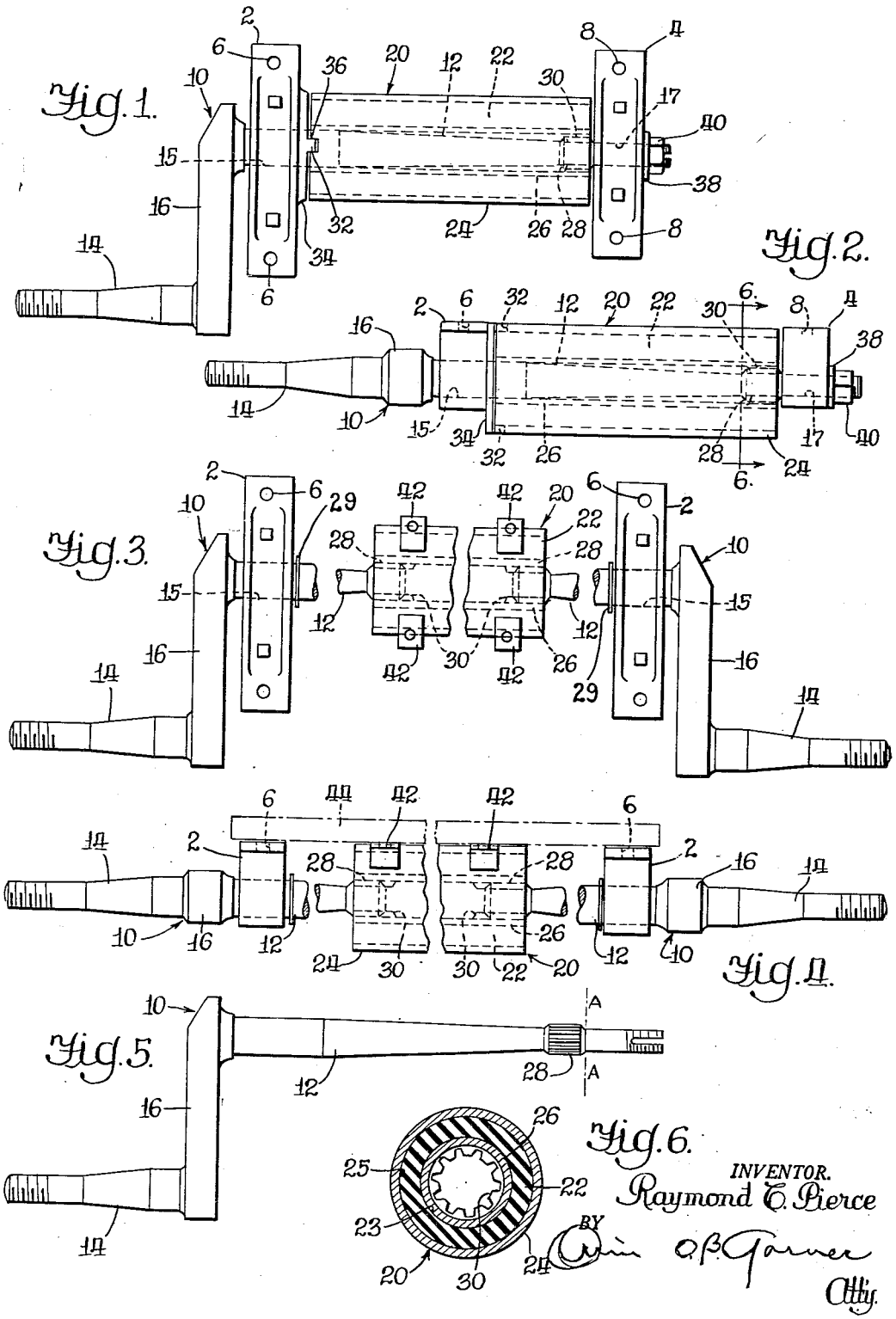
INVENTOR.
Raymond C. Pierce
BY
O. P. Garner
Atty.

United States Patent Office 2,769,631
Patented Nov. 6, 1956

2,769,631

AXLE ASSEMBLY

Raymond C. Pierce, Chicago, Ill.

Application April 8, 1952, Serial No. 281,182

9 Claims. (Cl. 267—57.1)

The invention relates to a novel axle assembly that may be used to resiliently support a related vehicle body or the like.

A general object of the invention is to provide an axle assembly wherein the potential of rubber, or like material, to absorb dynamic forces is utilized to flexibly support a related vehicle body.

Another object of the invention is to provide a novel axle assembly utilizing the resilient torsional deformation of a rubber tube to flexibly support a related vehicle body.

A more specific object of the invention is to provide an axle assembly of the class described that will support a related vehicle body and maintain said body in a substantially horizontal plane, that is, an axle assembly affording "level load" characteristics.

Still another specific object of the invention is to provide an axle assembly of the class described that will facilitate assembly and disassembly of the associated parts during repair or replacement of an individual part.

Other objects of the invention will become apparent in the course of the following description, wherein:

Figure 1 is a plan view illustrating one application of the invention;

Figure 2 is a side elevational view of the embodiment shown in Figure 1;

Figure 3 is a plan view of another embodiment of the invention;

Figure 4 is a side elevational view of the embodiment shown in Figure 3;

Figure 5 is a detail view showing the construction of the axle utilized in the assembly, and Figure 6 is a detail view taken along line 6—6 of Figure 2.

Describing the invention as disclosed in Figures 1 and 2, bearing blocks 2 and 4 are integral with or are secured to the bottom of a related vehicle body, as by bolt and nut means utilizing holes 6 and 8 of the related block, in such a manner as to dispose the axle, generally designated 10, transversely of a related vehicle body. The axle 10 comprises a main shaft 12 eccentrically carrying on one end thereof, another shaft or wheel spindle 14 by means of the transversely extended throw or crank arm 16, rigidly interconnecting the related ends of the main shaft and wheel spindle. The spindle 14 is designed to rotatably mount an associated wheel (not shown) by means of the conventional cup, cone, and bearing connection.

Bearing block 2, which is preferably of the integral type but may be of the demountable cap type, offers journal connection as at 15 for that portion of the shaft 12 adjacent the throw 16, at a point on the related vehicle body (not shown) adjacent a side thereof. Inboardly of the side of said body, bearing block 4, again preferably of the integral type, offers journal connection as at 17 for that portion of the shaft 12 adjacent its inboard end. Thus it is seen that the axle 10 extends transversely of and has journaled connection to the related body adjacent one side thereof. To complete the support offered the related vehicle body, another axle assembly identical with the one shown and described above is similarly disposed adjacent the other side of the truck, and such a disposition is to be understood inasmuch as the remarks herein will be directed to one axle assembly unless otherwise noted.

In the assembled condition the throw or crank arm 16 is preferably in an approximately horizontal position, hence the rotational axis of the associated wheel which is also the longitudinal axis of the spindle 14, is parallel to and trails the longitudinal axis of the main shaft 12. As the vehicle is loaded or as an associated wheel strikes an impediment in the terrain, a torque or twist is imparted to the main shaft 12. To flexibly resist and cushion the torque or twist action of the main shaft 12, a rubber torsional spring or spring unit, generally designated 20, is provided.

In the preferred form of the invention the torsional spring unit 20 comprises a cylindrical tube 22 having a substantially thick wall and which is composed of rubber or like resilient material. As seen best in Figure 6, the outside circumference of the rubber tube 22 is defined and limited by the encircling metal tube 24. The inside diameter of the rubber tube 22 is defined by the encircled metal tube 26. Both the outer tube 24 and the inner tube 26 are preferably of sufficient wall thickness to substantially resist torsional deformation under the operative action of the assembly hereinafter described. The metal tubes 24 and 26 are fixed to the rubber tube 22 by bonding the rubber tube 22 to the related surface of the abutting metal tube as at 23 and 25.

The torsion spring unit 20 may be positioned intermediate the bearing blocks 2 and 4 with the main shaft 12 immediately surrounded by the inner metal tube 26. Fixed connection is made between the shaft 12 and the spring unit 20, a preferred form of which is the complementary reception of the male spline or circumferential set of teeth 28 formed adjacent the inboard end of the shaft 12, by the adjacent female spline or teeth 30 formed on the inside diameter of the tube 26. Means are provided to resist axial rotation of the spring unit 20 and preferably comprise lugs 32 outstanding from the plate 34 which is, in turn, rigidly connected to the inside face of the outboard bearing block 2, said lugs being received by complementary slots 36 formed in the adjacent end of the outer metal tube 24.

The axle 10 is retained in the assembled position by means of the washer 38, which is keyed to the end of the shaft 12 and is retained in position by the conventional locking nut 40.

Referring now to Figures 3 and 4 which illustrate a varied embodiment of the concerned invention. The numerical designations here employed correspond to those used above where similar parts are denoted.

The torsional spring unit 20 is preferably positioned centrally of the related vehicle body and fixedly secured thereto as by welding the wings 42 of the metal tube 24 to the underside of the floor of said body, herein shown in phantom at 44. Adjacent each side of the body a bearing block 2 is secured thereto offering coaxial journaled connections for the rotatably supported axle units 10. It is to be noted that the torsion unit 20 is positioned to dispose the common longitudinal axis of the tubes 22, 24 and 26 transversely of the related body and in line with the common axis of the journal connections referred to above.

For the purposes of the embodiment shown in Figures 3 and 4, the end portion of the axle 10 as shown in detail in Figure 5, to the right of the vertical plane delineated by the line A—A, is to be removed leaving an axle having a spline 28 formed immediately on the end thereof. The axles 10, 10 on each side of the related body extend their main shafts 12 inboardly where connection is made to the associated end of the torsion spring unit 20 by means of the complementary reception of the attached male spline 28 by the related female spline 30 formed on the adjacent inside diameter of the tube 26. Thus in this embodiment the axles 10, 10 could be considered a single rigid axle unit having a center shaft composed of the main shafts 12, 12 and the interconnecting metal tube 24. The split retainer rings 29, or other suitable means, may be assembled to the shafts 12 inboardly of the related bearing blocks, thus preventing accidental disassembly of the axles 10.

In the operation of the embodiment of Figures 1 and 2, the torque or twisting action imparted to the main shaft 12, as hereinbefore mentioned, is transmitted to the inner metal tube 26 by means of the connection between said tube and said shaft. The outer metal tube 24 is fixed to resist axial rotational movement, hence the torque or twisting moment is absorbed and resisted by the resilient torsional deformation of the rubber tube 22 which is intermediate and secured to the inner tube 26 and outer tube 24.

In operation the embodiment of Figures 3 and 4 is substantially similar to that noted in reference to Figures 1 and 2 in that the twist or torque of the main shaft 12 is absorbed, resisted, and cushioned by the resilient torsional deformation of the spring unit 20. However, this embodiment offers another advantage in that the design maintains a "level load" action in the associated body. This is accomplished by the rigid connection, as hereinbefore noted, between the main shafts 12, 12 and the interconnecting metal tube 24, resulting in the transmission of rotational angular motion of one spindle 14 to the like spindle 14 on the other side of the body, hence maintaining the body in a substantially horizontal plane.

I claim:

1. In a supporting assembly for a related vehicle body, spaced bearing blocks connected to said body, a shaft journaled in said bearing blocks, a throw connected to one end of said shaft and extending transversely thereof, a spindle extending outboardly of said body and connected to the throw at a point spaced from the connection to said shaft, a metal tube having splined engagement with said shaft, only adjacent an end of the tube and an end of the shaft, another metal tube surrounding the first mentioned tube and without direct connection thereto, lugs disposed on one of said bearing blocks engaging said other tube and restricting axial rotation thereof, means interconnecting both of said tubes and operative to flexibly resist rotation of said shaft, and readily demountable retaining means connected directly to the shaft at a readily available point externally thereof whereby, upon removal of said retaining means, said shaft may be moved axially thereof and removed from the assembly.

2. A supporting assembly for a related vehicle body according to claim 1, wherein the retaining means consist of a threaded portion on the end of the shaft and a washer nut arrangement mounted on said threaded portion and abutting one of said blocks.

3. In a vehicle supporting assembly, spaced bearing blocks, a shaft journaled in said blocks, a throw on the end of the shaft, a spindle carried by the throw eccentrically of the shaft, a spring unit disposed intermediate said blocks and occupying substantially all of the space intermediate said blocks axially of the shaft, said unit comprising an inner metallic tube sleeved over said shaft, a splined connection between the shaft and said tube at one end of the latter, a journaled connection between the tube and the shaft at the end of the tube opposite the mentioned end, said tube and said shaft being without connection between the splined connection and the journaled connection, an outer metallic tube surrounding said inner tube, resilient material interposed between said tubes and bonded to both, one of said bearing blocks having spaced vertically aligned lugs on a side thereof adjacent the unit, slots in said outer metallic tube receiving said lugs whereby rotation of said outer tube is prevented, and a demountable nut and washer arrangement externally of the assembly on the end of said shaft abutting one of said blocks and operative to retain said shaft in said blocks and said unit.

4. In a vehicle supporting assembly, spaced bearing blocks, a shaft journaled in said blocks, a throw on the end of the shaft, a spindle carried by the throw eccentrically of the shaft, a spring unit disposed intermediate said blocks, said unit comprising an inner metallic tube sleeved over said shaft, a spline on said shaft intermediate said blocks and consisting of less than 25% of the axial length of said shaft intermediate said blocks, another spline on the inner metallic tube in engagement with said first mentioned spline, an outer metallic tube surrounding said inner tube, resilient material interposed between said tubes and bonded to both, one of said bearing blocks having spaced vertically aligned lugs on a side thereof adjacent the unit, slots in said outer metallic tube receiving said lugs whereby rotation of said outer tube is prevented, and readily demountable means on the shaft externally of the assembly operative to maintain said shaft in position in the assembly.

5. In a vehicle supporting assembly, spaced bearing blocks, a shaft journaled in said blocks, a throw on the end of the shaft, a spindle carried by the throw eccentrically of the shaft, a spring unit disposed intermediate said blocks, said unit comprising an inner metallic tube sleeved over said shaft, a spline on said shaft intermediate said blocks and consisting of less than 25% of the axial length of said shaft intermediate said blocks, another spline on the inner metallic tube in engagement with said first mentioned spline, an outer metallic tube surrounding said inner tube, resilient material interposed between said tubes and bonded to both, interlocking means on one of said bearing blocks connecting said one block to said unit and operative to prevent rotation of said outer tube, readily demountable retaining means on the shaft externally of the assembly, said shaft being demountable from the assembly upon removal of said retaining means by movement of said shaft axially thereof, said interlocking means accommodating vertical removal of said unit upon the disassembly of said shaft.

6. In a vehicle supporting assembly, bearing means comprising spaced bearing blocks, shaft means journaled in said bearing blocks, throw means on at least one end of said shaft means, spindle means carried by the throw means eccentrically of the shaft means, a spring unit disposed intermediate said blocks and occupying substantially all of the space intermediate said blocks axially of the shaft means, said spring unit comprising an inner metallic tube sleeved over said shaft means, splined connection means between the shaft means and said tube adjacent at least one end of said tube, journaled connection means between the tube and the shaft means at at least one end of the tube, said shaft means and said tube being without other connection therebetween, an outer metallic tube surrounding said inner tube, resilient material disposed between the tubes and bonded to both, spaced vertically aligned lugs on an inboard side of one of said bearing blocks adjacent said spring unit, slots in said outer metallic tube receiving said lugs, thereby preventing rotation of said outer tube, and readily demountable retaining means connected directly to the shaft means whereby, upon removal of said retaining means, said shaft means may be readily removed from the assembly.

7. In a vehicle supporting assembly, spaced bearing blocks, shaft means journaled in said blocks, throw means on at least one end of said shaft means, spindle means carried by said throw means eccentrically of the shaft means, a spring unit disposed intermediate said blocks, said spring unit comprising an inner metallic tube sleeved over said shaft means, spline means on said shaft means intermediate said blocks and consisting of less than twenty-five percent of the axial length of said shaft means, other spline means on the inner metallic tube in splined engagement with the first mentioned spline means, an outer metallic tube surrounding said inner tube, resilient material interposed between said tubes and bonded to both, spaced vertically aligned lugs on one side of at least one of said blocks, slots in said outer metallic tube receiving said lugs whereby axial rotation of said outer tube is prevented, and readily demountable means on the shaft means operative to maintain said shaft means in position within the assembly.

8. In a supporting assembly for a related vehicle body, spaced bearing blocks connected to said body, a shaft journaled in said blocks, a spindle eccentrically connected to said shaft, a torsional spring unit operative to flexibly resist axial rotation of said shaft and comprising an inner metal tube having splined connection to said shaft, said shaft being partially within the tube and the splined connection being located adjacent an end of the shaft and tube only, an outer metal tube surrounding said first mentioned tube, said outer metal tube being disposed between and spaced from said blocks, another tube of nonmetallic resilient material disposed intermediate said outer and inner tubes and connected therebetween, a plate fixed on said body and connected to said outer tube to restrain axial rotation of said outer metallic tube, and readily demountable retaining means connected directly to the shaft externally thereof whereby, upon removal of said retaining means, said shaft may be rotatably adjusted relative to said inner tube.

9. In an axle assembly for a related vehicle body, spaced bearing blocks connected to said body, a shaft journaled in said blocks, a crank arm extending transversely of the shaft and having an end connected thereto, a spindle directionally paralleling said shaft and connected to the crank arm adjacent the end opposite the mentioned end, a male spline integral with said shaft adjacent an end thereof and comprising less than twenty per cent of the shaft length, a metal tube having a female spline cooperatively engaging the male spline, another metal tube encircling said first mentioned tube and disposed between and spaced from said blocks, a plate fixed on said body securing said second mentioned tube against rotational movement, a connection between the first mentioned and second mentioned tubes composed of a nonmetallic elastically deformable material, and readily demountable retaining means connected directly to the shaft at a point externally thereof whereby, upon removal of said retaining means, said shaft may be readily removed from and rotatably adjusted relative to said tube.

References Cited in the file of this patent

UNITED STATES PATENTS

| | | |
|---|---|---|
| 1,710,809 | Broadwell | Apr. 30, 1929 |
| 2,051,864 | Knox et al. | Aug. 25, 1936 |
| 2,103,590 | Lefevre | Dec. 28, 1937 |
| 2,176,971 | Klotsch | Oct. 24, 1939 |
| 2,286,609 | Ledwinka | June 16, 1942 |
| 2,371,864 | Woolson et al. | Mar. 20, 1945 |
| 2,409,501 | Krotz | Oct. 15, 1946 |
| 2,455,787 | Linn | Dec. 7, 1948 |

FOREIGN PATENTS

| | | |
|---|---|---|
| 191,116 | Switzerland | Sept. 1, 1937 |
| 878,595 | France | Oct. 19, 1942 |